US008332111B2

(12) United States Patent
McDonnell et al.

(10) Patent No.: US 8,332,111 B2
(45) Date of Patent: Dec. 11, 2012

(54) DUAL CLUTCH DRIVELINE TWIST CONTROL

(75) Inventors: Alexander P. McDonnell, Dexter, MI (US); Terry G. Feldpausch, Carleton, MI (US); Bradley D. Riedle, Northville, MI (US); Jeffrey A. Doering, Canton, MI (US); Peter D. Kuechler, Canton, MI (US); John E. Rollinger, Sterling Heights, MI (US); David H. Schmitt, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 305 days.

(21) Appl. No.: 12/916,831

(22) Filed: Nov. 1, 2010

(65) Prior Publication Data

US 2012/0109477 A1     May 3, 2012

(51) Int. Cl.
*F16D 48/12* (2006.01)
*B60W 10/04* (2006.01)
(52) U.S. Cl. ............................................. 701/68; 701/71
(58) Field of Classification Search .................. 701/68, 701/71; 477/34, 39–40, 70, 77
See application file for complete search history.

(56) References Cited

U.S. PATENT DOCUMENTS

| 6,780,141 | B1 | 8/2004 | Kao et al. |
| 6,991,585 | B2 | 1/2006 | Colvin et al. |
| 7,086,989 | B2 | 8/2006 | Siebigteroth et al. |
| 7,094,176 | B2 | 8/2006 | Budal et al. |
| 7,384,374 | B2 | 6/2008 | Jiang |
| 7,455,619 | B2 | 11/2008 | Jiang |
| 2007/0213909 | A1* | 9/2007 | Doering et al. ................. 701/54 |
| 2007/0213910 | A1* | 9/2007 | Doering et al. ................. 701/54 |
| 2009/0192018 | A1 | 7/2009 | Hoffmeister et al. |
| 2009/0275440 | A1* | 11/2009 | Doering et al. ............... 477/102 |
| 2011/0034298 | A1* | 2/2011 | Doering et al. ................. 477/54 |

\* cited by examiner

*Primary Examiner* — Yonel Beaulieu
(74) *Attorney, Agent, or Firm* — David B. Kelley; MacMillan, Sobanski & Todd, LLC

(57) ABSTRACT

A method for controlling a driveline having a transmission clutch includes locking the clutch before a driveline lash crossing occurs; maintaining a locked clutch during the lash crossing; after the lash crossing occurs, increasing a clutch capacity at a slower rate than a driveline twist torque rate; and after the lash crossing occurs, producing clutch slip by controlling engine torque and clutch capacity such that engine torque exceeds clutch capacity.

34 Claims, 4 Drawing Sheets

DUAL CLUTCH DRIVELINE TWIST CONTROL

BACKGROUND OF THE INVENTION

1. Field of the Invention

This invention relates generally to control of a motor vehicle driveline, particularly to control during a tip-in of a driveline that includes a dual clutch automatic transmission.

2. Description of the Prior Art

During normal operation of a dual-clutch automatic transmission the driven input is connected to the transmission output shaft through gears. When the undriven input is preselected in a gear position in preparation for an anticipated gear ratio change, it is possible for driveline oscillations to cause an audible click-clack sound, during tip-in events. That sound is the result of oscillations in driveline torque and speed causing speed and torque reversals on the transmission components that are driveably connected to the transmission output but not connected to the engine.

Because the undriven input shaft is connected to the output when the next gear is preselected and before its connection to the engine, the meshing helical, preselected gears produce axial motion within the transmission on the undriven shaft. Because the input clutch corresponding to the preselected gear is not applied under these conditions, the entire shaft is free to move axially. When the amplitude of this motion exceeds the axial lash of the system, an impact occurs resulting in an audible output. The resulting sound is described as click-clack. As the driveline oscillates, the lash is taken up on both sides of the gear train.

In general, for good drivability the desired drive line response will be smooth and free of oscillations. To achieve this end, it is necessary to control the energy imparted into the drive line. Energy that is not converted to vehicle acceleration is dissipated through torsional oscillations until that energy is recovered by the clutch, accelerating the vehicle. The coordination of engine and clutch torques is of critical import when managing drive line energy.

SUMMARY OF THE INVENTION

A method for controlling a driveline having a transmission clutch includes locking the clutch before a driveline lash crossing occurs; maintaining a locked clutch during the lash crossing; after the lash crossing occurs, increasing a clutch capacity at a slower rate than a driveline twist torque rate; and after the lash crossing occurs, producing clutch slip by controlling engine torque and clutch capacity such that engine torque exceeds clutch capacity.

While the driveline is locked, engine torque controls the energy input to the driveline. By consistently delivering twist at a target rate, the control delivers consistent tip-in feel and response regardless of the driver's accelerator pedal input.

The control merges signals from multiple systems and processors to estimate an unmeasurable state of the driveline that is essential to successfully managing the engine and clutch torque during a lash crossing in a vehicle driveline that includes a dual input clutch automatic transmission.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
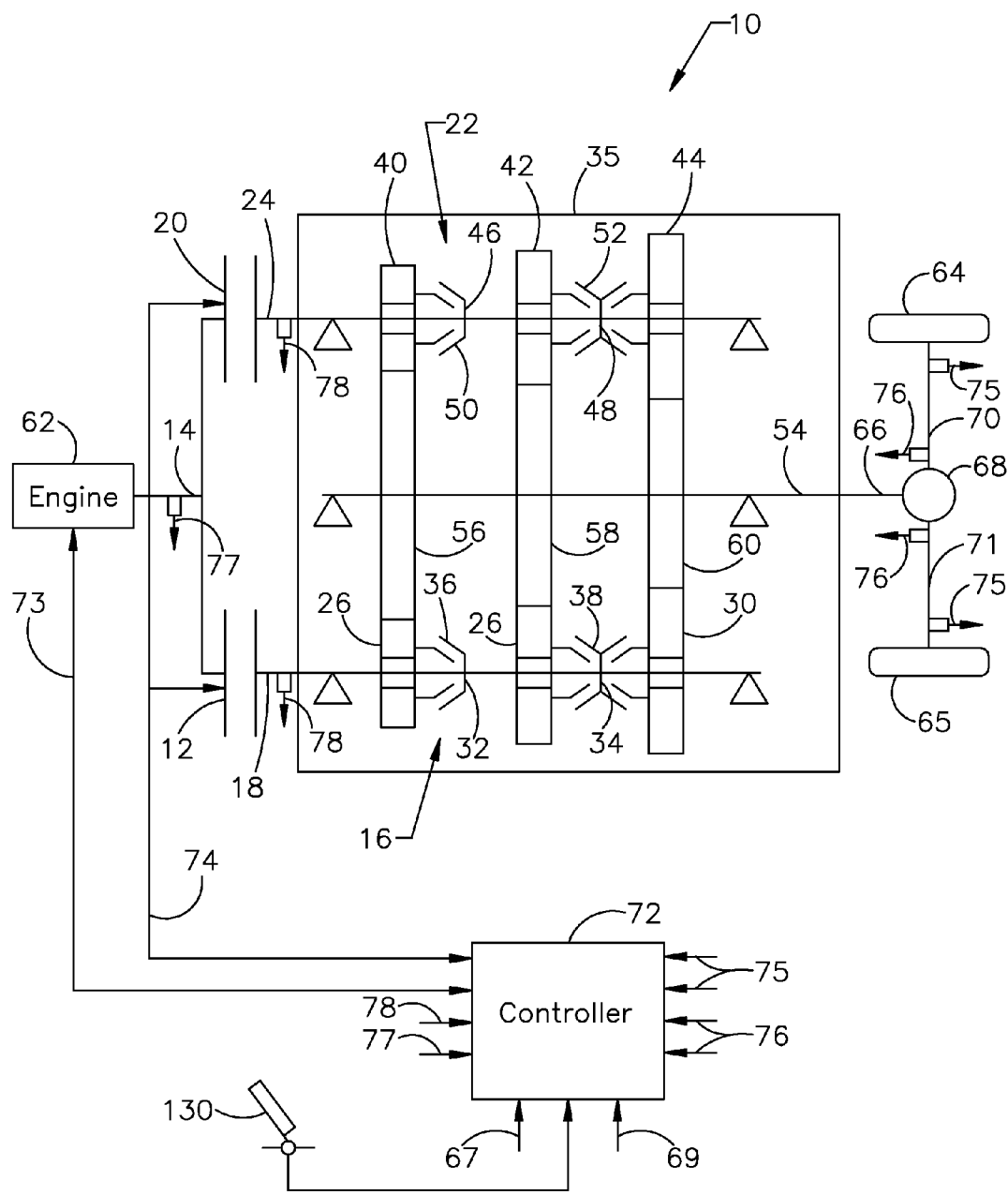
FIG. 1 is a schematic diagram showing details of vehicle driveline that includes a dual clutch powershift automatic transmission and a system for controlling the driveline components.

FIG. 1 illustrates details of a powershift transmission 10 that includes the first input clutch 12, which selective connects the input 14 of the transmission alternately to the even-numbered gears 16 associated with a first layshaft 18, and a second input clutch 20, which selective connects the input 14 alternately to the odd-numbered gears 22 associated with a second layshaft 24. A power source, such as an engine, is continuously driveably connected to the input 14. The road wheels of the vehicle are continuously driveably connected to the output 54 through a driveline, which may include final drive gearing, a driveshaft, a differential mechanism and laterally directed axle shafts, each axle shaft extending from the differential to one of the road wheels.

Layshaft 18 supports pinions 26, 28, 30, which are each journalled on shaft 18, and couplers 32, 34, which are secured to shaft 18. Pinions 26, 28, 30 are associated respectively with the second, fourth and sixth gears. Coupler 32 includes a sleeve 36, which can be moved leftward to engage pinion 26 and driveably connect pinion 26 to shaft 18. Coupler 34 includes a sleeve 38, which can be moved leftward to engage pinion 28 and driveably connect pinion 28 to shaft 18 and can be moved rightward to engage pinion 30 and driveably connect pinion 30 to shaft 18.

Layshaft 24 supports pinions 40, 42, 44, which are each journalled on shaft 24, and couplers 46, 48, which are secured to shaft 24. Pinions 40, 42, 44 are associated respectively with the first, third and fifth gears. Coupler 46 includes a sleeve 50, which can be moved leftward to engage pinion 40 and driveably connect pinion 40 to shaft 24. Coupler 48 includes a sleeve 52, which can be moved leftward to engage pinion 42 and driveably connect pinion 42 to shaft 24 and can be moved rightward to engage pinion 44 and driveably connect pinion 44 to shaft 24.

Transmission output 54 supports gears 56, 58, 60, which are each secured to shaft 54. Gear 56 meshes with pinions 26 and 40. Gear 58 meshes with pinions 28 and 42. Gear 60 meshes with pinions 30 and 44.

Couplers 32, 34, 46, 52 may be synchronizers, or dog clutches or a combination of these.

A power source, such as an engine 62, is continuously driveably connected to the input 14. The road wheels 64, 65 of the vehicle are continuously driveably connected to the output 54 through a driveshaft 66. Torque is transmitted in a positive torque condition from the engine through a differential mechanism 68 and laterally directed halfshafts 70, 71 to the road wheels 64, 65. During negative torque condition torque is transmitted from the wheels 64, 65 to the engine 62.

The engine 62 and transmission 10 are supported by the vehicle chassis on engine mounts, which permit rotation of the engine-transmission assembly in response to torsional changes produced by the engine. Each engine mount includes a negative stop, which limits the rotation the engine-transmission assembly in one rotary direction, and a positive stop, which limits rotation in the opposite rotary direction. When the vehicle is coasting, the engine-transmission assembly rests on the negative stops. When the vehicle operator tips-in the accelerator pedal, the engine-transmission assembly rotates to the positive stop.

Lash is the angular displacement of the engine-transmission assembly about the axis of the engine on the engine mounts. A lash crossing that occurs in response to a tip-in following a coast condition, is angular displacement of the engine-transmission assembly from the negative engine mount stops to the positive engine mount stops.

Reaction torque is the torque transmitted from the twisting halfshafts 70, 71 back through the transmission gears to the engaged clutch 12, 20.

Halfshaft twist is the angular rotation of the halfshafts 70, 71 about a polar axis through the halfshafts that occurs in response to the application of torque applied to one end of the halfshafts and transmitted to their opposite end.

Figure 2:
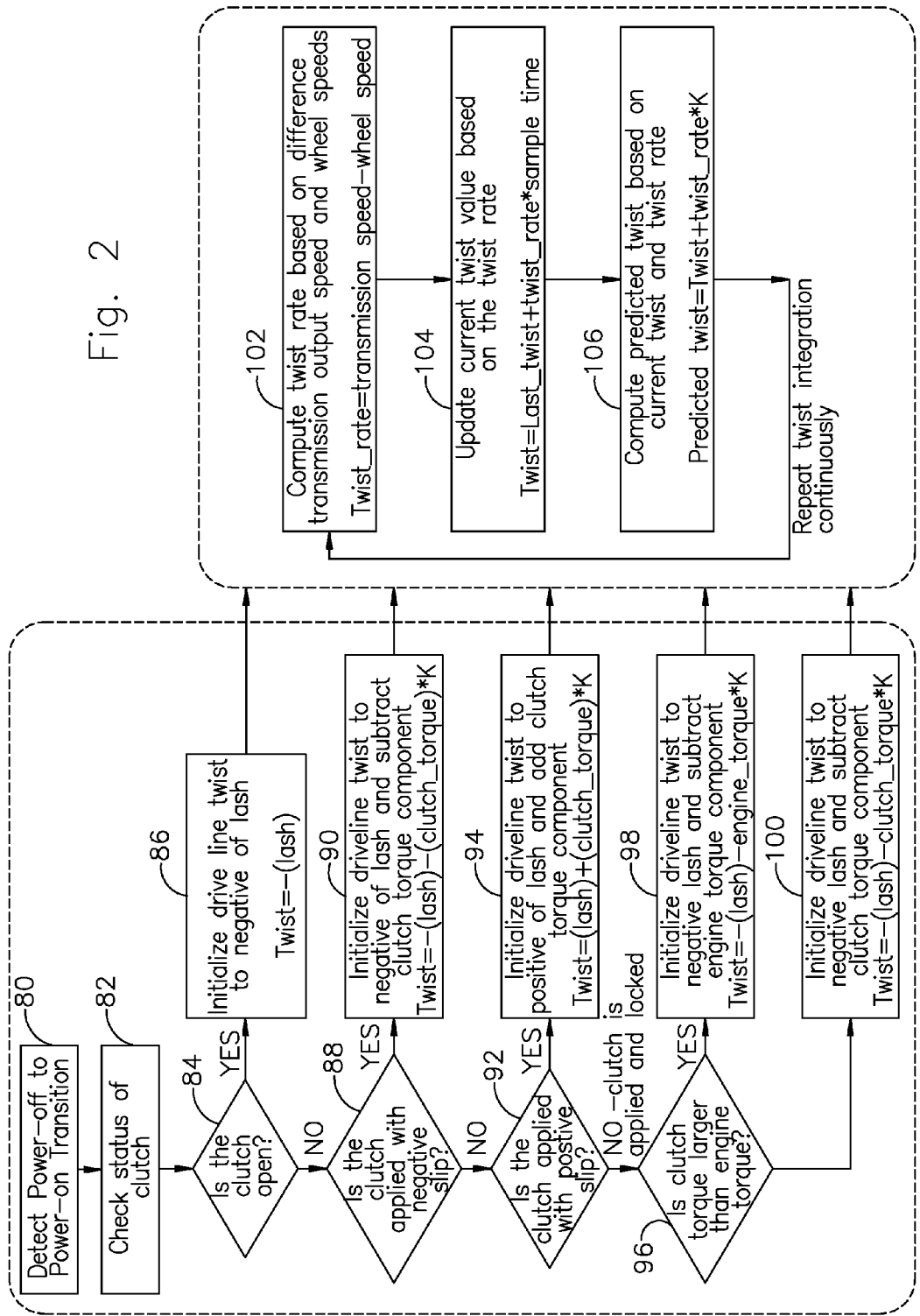
FIG. 2 is logic flow diagram showing the steps of a method for estimating twist in the driveline of FIG. 1.
Figure 3:
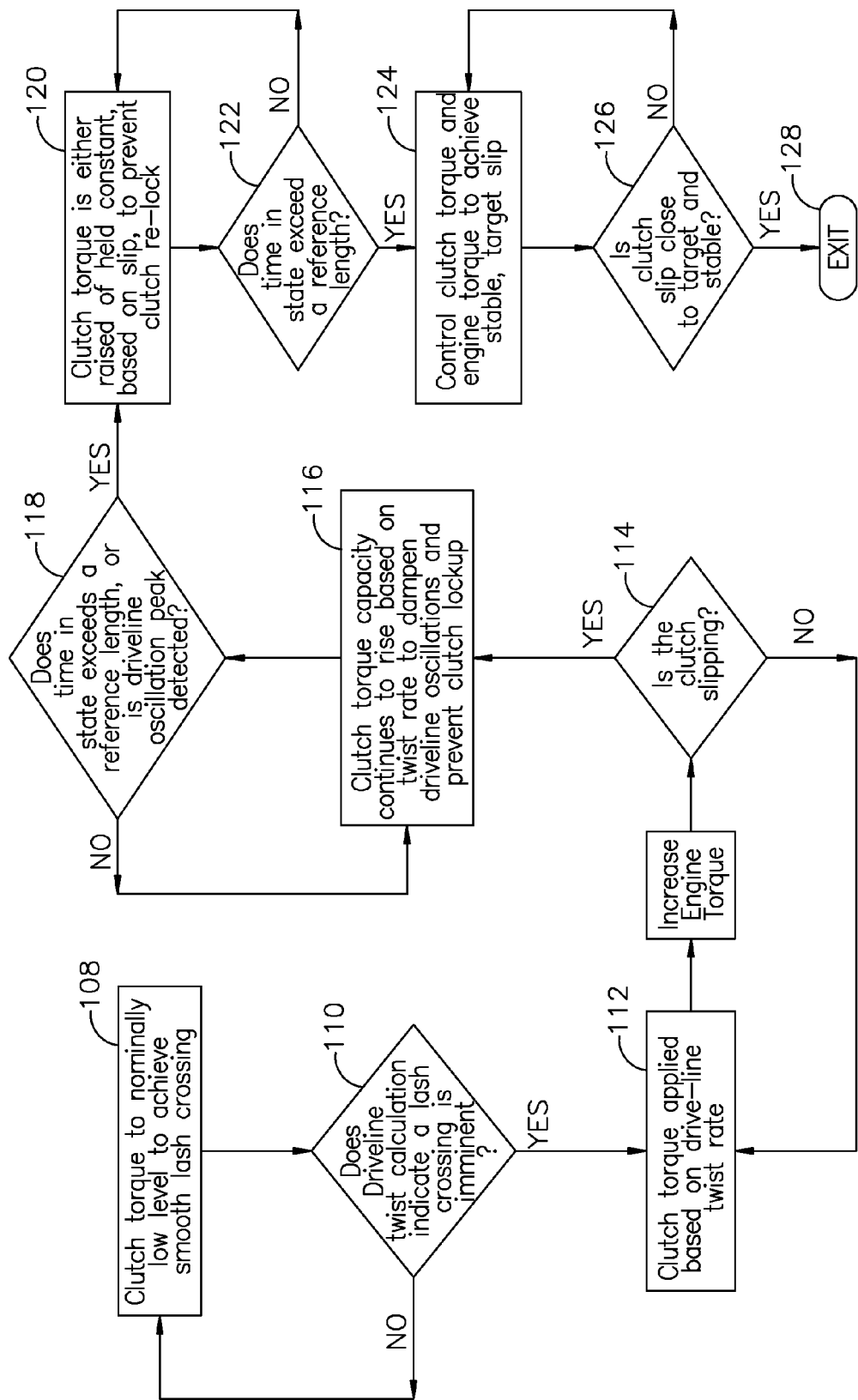
FIG. 3 is logic flow diagram showing the steps of a method for estimating twist in the driveline of FIG. 1.

A controller 72, which includes a microprocessor accessible to electronic memory containing the algorithms of FIGS. 2 and 3, receives from an engine controller an input signal 67 representing torque produced by engine 62, and receives from a transmission controller an input signal 69 representing torque produced by the transmission input clutch 12, 20 corresponding to the current transmission gear. Controller 72 produces an output electronic signal 73 representing commanded engine torque, and an output signal 74 representing the commanded torque capacity of clutches 12, 20. Controller 72 also receives input signals 75, 76 representing the speed at the outboard and inboard ends, respectively, of halfshafts 70, 71; signal 77 representing the speed of transmission input 14; signal 78 representing the speed of layshaft 18; and signal 79 representing the speed of layshaft 24. The position of the vehicle's accelerator pedal 130 is represented by an input signal 69 communicated to controller 72.

Controller 72 repetitively samples the input signals at each execution of the algorithms and uses speed signals 77, 78 to determine the magnitude of variable slip across clutches 12, 20 and speed signals 75, 76 to determine the twist angle of the halfshafts 70, 71, hereinafter referred to as halfshaft or driveline twist.

There are five primary conditions in which driveline twist is estimated: (1) open clutch, (2) clutch applied with negative slip, (3) clutch applied with positive slip, (4) near zero clutch slip with calculated engine torque less than the negative of clutch torque and, (5) near zero clutch slip with engine torque greater than the negative of clutch torque.

FIG. 2 illustrates the steps of the control for initializing, integrating and estimating driveline twist after detecting, at step 80, a transition from a power-off condition to a power-on condition. At step 82 the status of the currently operative input clutch 12, 20 is checked.

At step 84 a test is made to determine whether the clutch is open. When the clutch 12, 20 is commanded open, at step 86 driveline twist is initialized as a negative value equivalent to the driveline twist required to travel through lash. This twist to travel through lash is measured in the gear box 10 and is set as a calibrated value. In this case, driveline twist is the degrees of twist required to traverse lash if the output 54 is held and the input 14 is turned from one side of lash to the opposite side.

At step 88 a test is made to determine whether the clutch 12, 20 is applied with negative slip. If clutch slip is sufficiently negative and the estimated clutch torque capacity is above zero, at step 90 a negative overall driveline twist, which is the algebraic sum of lash crossing twist and halfshaft twist, is estimated using the equation:

$$\text{Twist} = -(\text{Lash crossing twist}) - (\text{Estimated clutch torque} * \text{Gear ratio} * K)$$

wherein lash crossing twist is the angular twist to travel through lash as described above; gear ratio is the ratio of the currently engaged transmission gear; and K is the torsional spring constant of the subject halfshaft.

Similarly, at step 92 a test is made to determine whether the clutch 12, 20 is applied with positive slip. If clutch slip is sufficiently positive and the clutch torque capacity is above zero, at step 94 a positive overall driveline twist is estimated using the equation:

$$\text{Twist} = \text{Lash crossing twist} + (\text{Estimated clutch torque} * \text{Gear ratio} * K)$$

At step 96 a test is made to determine whether the torque capacity of the clutch is greater than engine torque. When clutch slip is below a minimum reference slip or near zero, and engine torque is less than the negative of the clutch torque capacity, the driveline is assumed to have a negative twist that is dependent on the clutch torque capacity. This approach assumes the estimation of the clutch torque capacity is more accurate than the engine torque estimation in the presence of negative engine torque. In this case at step 100, the overall driveline twist is calculated the same as in the step 90 equation:

$$\text{Twist} = -(\text{Lash crossing twist}) - (\text{Estimated clutch torque} * \text{Gear ratio} * K)$$

When clutch slip is near zero, and the engine torque is greater than the negative of the clutch torque capacity, the torque contributing to the driveline twist is determined to be the lesser of 0.0 Nm and the current engine torque. This assumes that, in this condition, the driveline twist must be no greater than the negative of the lash crossing twist. This assumption is based on the twist initialization assessment being done in a power-off coasting condition, such that the driveline will be pushed to the negative side of lash. In this case at step 98, the overall driveline twist is estimated using the equation:

$$\text{Twist} = -(\text{Lash crossing twist}) - (\text{lesser of engine torque and } 0.0 \text{ Nm} * \text{Gear ratio} * K)$$

The estimation of driveline twist sets the foundation for coordination of clutch and engine torque control systems.

By monitoring overall driveline twist it is possible to predict when the lash crossing will occur in advance of the actual event. After twist is initialized, as described above, twist is continually updated using the difference in the rotational speeds at each end of the halfshafts 70, 71. The speed sensors for measuring transmission speed may be located at the inboard end of the halfshafts, and the wheel speed sensors are located on the outboard end of the halfshafts. Alternatively, transmission speed may be measured at the output 54 or input 14. The rate of change of the driveline twist is directly calculated at step 102 using the difference between transmission speed and wheel speed. The rate of change of the driveline twist, multiplied by the interval between samples, i.e., the sample time, allows for adjustments to the driveline twist at step 104.

At step 106, the current driveline twist and the twist rate of change are used by the control algorithm of FIG. 3 to predict when the driveline will reach the positive side of lash. Prediction of the lash crossing provides a means of accounting for the phase lag between commanded clutch torque and clutch torque response. The typical response lag time is 0.030 to 0.040 seconds; therefore, it is important to begin increasing the clutch torque in advance of reaching the positive side of lash to provide a known locked clutch condition and improved tip-in response.

The control method manages engine torque during tip-in events to control the energy input into the driveline by limiting the speed of the driveline twist prior to and during the lash crossing and then raising engine torque to produce slip at the proper time relative to the frequency of the driveline.

The engine control algorithm uses estimated driveline twist from step 106 to lower engine torque prior to the gearbox lash crossing and holding engine torque low through the end of lash to achieve a targeted twist rate.

Figure 4:
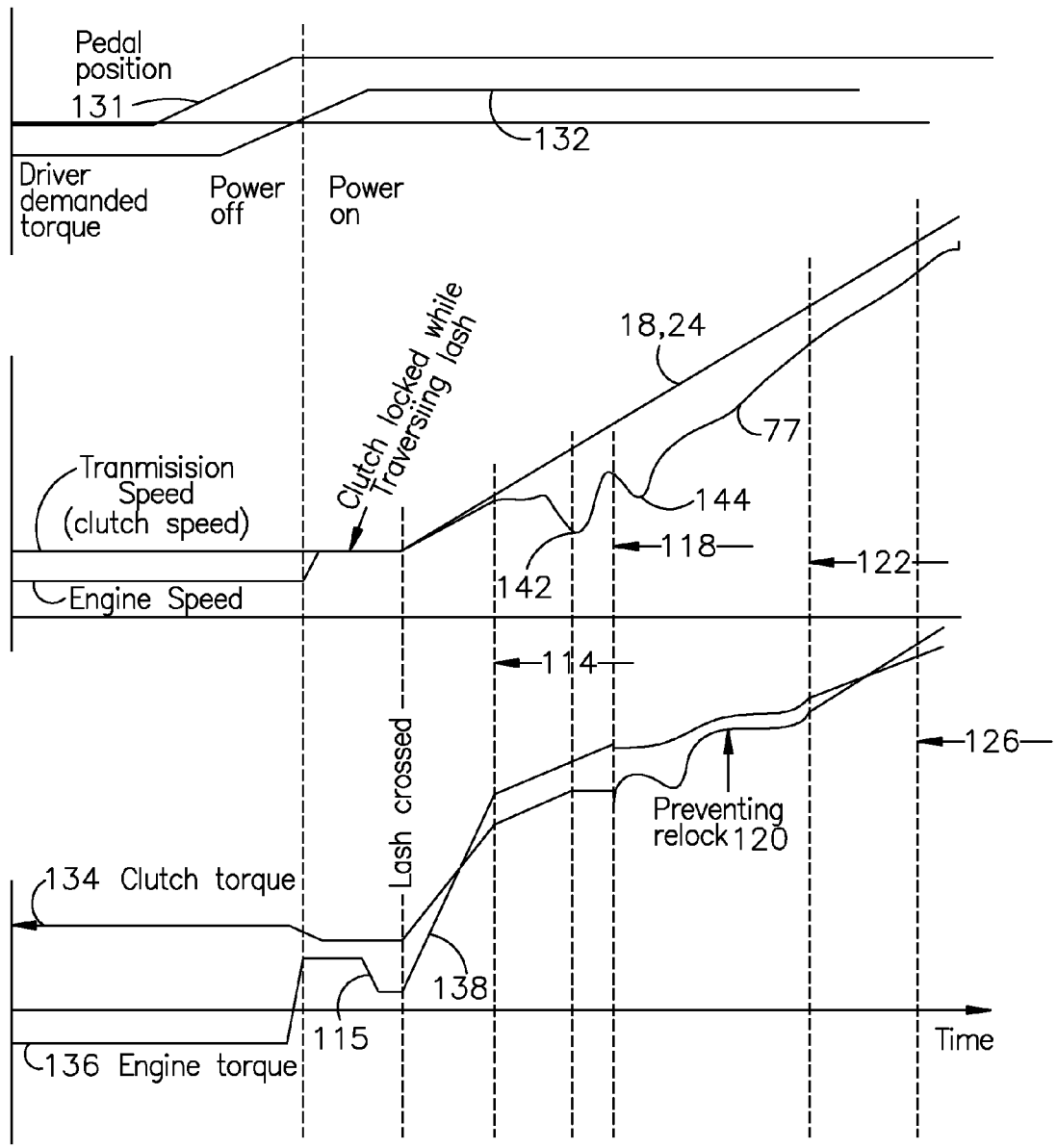
FIG. 4 is a graph of signals that control the driveline during a lash crossing.

FIG. 4 shows a tip-in occurring when the position 131 of accelerator pedal 130 is depressed, thereby producing a demanded wheel torque 132.

At step 108 the torque transmitting capacity of the transmission input clutch 12, 20 that corresponds to the current transmission gear is set by signal 74 to a low magnitude in order to achieve a smooth lash crossing while locking the clutch. The torque transmitting capacity of the clutch 12, 20 is sometimes called clutch torque capacity, clutch capacity or clutch torque.

While the torque capacity 134 of the subject clutch 12, 20 is at this low magnitude, engine torque 136 is held low by signal 73 so that the drivetrain smoothly moves through lash with a targeted twist rate.

As FIG. 4 illustrates, when the driver has demanded an increase in torque 132, the engine torque is increased to raise speed. Then, if the twist calculation indicates that a lash crossing is eminent, engine torque is reduced briefly at 115 so that when the engine shifts from the negative engine mount to the positive engine mount no bump perceptible to the vehicle occupants occurs. This reduction in engine torque does not decrease engine speed; it minimizes the force of the impact that occurs when the engine shifts to the positive mount.

Preferably, reducing engine torque is accomplished by at least one of the following techniques in response to signal 73: retarding engine spark, cutting out an engine fuel injector, reducing a pulse width of an engine fuel injector, changing lift of an engine intake valve, and changing duration of lift of an engine intake valve.

At step 110, controller 72 performs a test to determine whether the estimated driveline twist indicates that a lash crossing is imminent. If a lash crossing is not imminent, control returns to step 108.

When an imminent lash crossing has been identified, at step 112 clutch torque capacity 134 is increased by signal 74 to ensure that the subject clutch 12, 20 remains locked at the completion of the lash crossing.

At step 113, engine torque 136 is smoothly increased by signal 73, preferably along a linear ramp 138.

At step 114, controller 72 performs a test to determine from speed signals 77, 78 whether the subject clutch is slipping. If the result of test 114 is negative, control returns to step 112.

If the result of test 114 is positive, at step 116 signal 74 continues to increase clutch torque capacity 134 based on the twist rate, thereby dampening driveline torque oscillations yet preventing the clutch from becoming locked, i.e., fully engaged. Positive clutch slip is produced by allowing the reaction to driveline torque to exceed the torque capacity of the clutch. The halfshafts 70, 71 provide the reaction to driveline torque.

By allowing clutch torque capacity 134 to increase at a slightly lower rate than the rate of change of reaction torque, it is possible to consistently initiate clutch slip within the first oscillatory period of a locked clutch driveline. Once the reaction torque exceeds the clutch torque capacity, slip occurs and the torsional natural frequency of the driveline changes to the slipping clutch frequency of approximately 6 Hz. By continually increasing clutch torque capacity 134 immediately following occurrences of clutch slip at 142, 144, impending driveline oscillations are dampened. The increase in clutch torque capacity acts as a viscous drag on the driveline, dampening the system. Because the rate of increase in clutch torque capacity 134 is determined by the twist rate or driveline reaction torque rate, the rate of increase of clutch torque capacity remains proportional to the torsional energy input to the driveline.

Controller 72 uses the control algorithm to determine clutch torque capacity from Clutch Torque=(Torque last loop)+(loop time*driveline reaction torque rate)

wherein loop time is the length of a period between successive executions of the algorithm.

Controller 72 determines driveline reaction torque rate from

Driveline reaction torque rate=(Driveline twist rate)*(*K* factor)/(Gear ratio)$^2$ wherein gear ratio is the gear ratio produced by the current operating gear produced by transmission 10.

Clutch torque capacity 134 continues to increase for a period of time determined by the frequency of the driveline until the bottom of the first 6 Hz oscillation.

At step 118, controller 72 performs a test to determine whether clutch torque capacity has remained constant for longer than a reference length, or a peak in transmission clutch speed oscillation has occurred. If the result of test 118 is negative, control returns to step 116.

If the result of test 118 is positive indicating that the driveline damping phase is completed, at step 120 engine torque 136 and clutch torque capacity 134 are controlled by signals 73, 74, respectively, to prevent the subject input clutch from relocking and to prevent high slip rattle, commonly referred to as grattle.

Clutch torque capacity is controlled as a function of clutch slip. If slip is low, indicating that the possibility of a clutch relock is imminent, clutch torque is held constant signal 74 allowing engine torque to increase and clutch slip to increase. If slip is high, clutch torque capacity continues to increase as a function of slip to prevent flare and to improve tip-in response.

At step 122, controller 72 performs a test to determine whether the time allowed for preventing the relock has expired. If the result of test 122 is true, at step 124 engine torque is controlled in a similar manner by coordinating the timing of the increase in engine torque to a margin above clutch torque capacity to achieve a stable target slip across the subject clutch. Once the first oscillatory period is completed, engine torque is ramped, preferably at a linear rate, by signal 73 towards the driver demanded torque 132. If slip across the clutch is accelerating at an excessive rate, engine torque is reduced to prevent a speed flare.

At step 126, controller 72 performs a test to determine whether clutch slip has become close to the target slip and remains stable. If the result of test 126 is true, the control algorithm is exited at step 128.

In accordance with the provisions of the patent statutes, the preferred embodiment has been described. However, it should be noted that the alternate embodiments can be practiced otherwise than as specifically illustrated and described.

The invention claimed is:

1. A method for controlling a driveline having a transmission clutch, comprising:
   (a) producing a signal representing desired engine torque to limit driveline twist rate while the clutch is locked and before a lash crossing;
   (b) producing a second signal representing desired clutch capacity to maintain the clutch locked during the lash crossing;
   (c) after the lash crossing, using the signal to increase clutch capacity at a slower rate than the driveline twist rate;
   (d) using the signals to produce clutch slip by controlling engine torque and the clutch capacity such that engine torque exceeds the clutch capacity.

2. The method of claim 1 wherein step (a) further comprises:
   using the second signal to produce clutch slip after the lash crossing by setting clutch capacity less than a reaction torque to the lash crossing.

3. The method of claim 1, wherein step (c) further comprises:
   after the lash crossing occurs, adjusting the second signal to increase clutch capacity at a slower rate than the driveline twist torque rate.

4. The method of claim 1, wherein steps (c) and (d) further comprises:
   preventing the clutch from relocking but using the signal to control engine torque and clutch capacity such that clutch slip is produced.

5. The method of claim 1, further comprising:
   using the signal to increase engine torque such that a driver demanded wheel torque is produced.

6. The method of claim 1, wherein step (d) further comprises:
   adjusting the signal to decrease engine torque relative to clutch capacity, if clutch slip is greater than a reference clutch slip; and
   adjusting the signal to increase engine torque relative to clutch capacity, if clutch slip is less than a reference clutch slip.

7. The method of claim 1, wherein step (a) further comprises using an estimated driveline twist and the driveline twist rate to determine a predicted drive line twist for the lash crossing.

8. The method of claim 1, wherein step (a) further comprises:
   estimating driveline twist;
   using a first speed signal representing speed of a transmission output and a second speed signal representing speed of a road wheel to determine the driveline twist rate;
   using the estimated driveline twist, the driveline twist rate, and a torsional spring constant of a driveline shaft to determine a predicted drive line twist for the lash crossing.

9. A method for controlling a driveline having a transmission clutch, comprising:
   (a) locking the clutch before a lash crossing;
   (b) maintaining the clutch locked during the lash crossing;
   (c) increasing a clutch capacity at a rate coordinated with an estimated driveline twist rate;
   (d) after the lash crossing occurs, producing clutch slip by controlling engine torque and clutch capacity such that engine torque exceeds clutch capacity;
   (e) reducing the rate of increase in clutch capacity.

10. The method of claim 9, wherein step (c) is executed before the lash crossing is completed.

11. The method of claim 9, wherein step (a) and (b) further comprise using an estimated driveline twist and the driveline twist rate to determine a predicted drive line twist for the lash crossing.

12. The method of claim 9, wherein steps (a) and (b) further comprise:
   estimating the driveline twist;
   estimating an initial value of driveline twist based on a combination of measured engine speed, input shaft speed, engine torque, clutch torque and a driveline torsional spring constant;
   determining the driveline twist rate using a difference between a transmission shaft speed and wheel speed, and a scaling of the transmission shaft speed based on gear ratio;
   updating the estimated current driveline twist; and
   predicting the driveline twist a period of time into the future.

13. The method of claim 12 wherein updating the estimated current driveline twist and predicting the driveline twist a period of time into the future are executed by integrating the driveline twist rate.

14. The method of claim 9, wherein steps (a) and (b) further comprise:
   reducing engine torque while crossing driveline lash to limit the driveline twist rate at the end of the lash crossing.

15. The method of claim 14, wherein:
   reducing engine torque while crossing lash is accomplished by at least one of retarding engine spark, cutting out an engine fuel injector, and reducing a pulsewidth of an engine fuel injector.

16. The method of claim 14, wherein:
   reducing engine torque while crossing lash is accomplished by at least one changing lift of an engine intake valve, and changing duration of lift of an engine intake valve.

17. The method of claim 14, wherein:
   the reduction of engine torque occurs after the driveline has entered lash; and
   the increase in engine torque occurs before completion of the lash crossing based on a prediction of driveline twist.

18. The method of claim 14, further comprising:
   modulating engine torque during the lash crossing; and
   increasing engine torque in anticipation of the end of lash crossing and increasing clutch torque in anticipation of end of lash crossing are controlled based on an estimated driveline twist.

19. The method of claim 9, wherein step (c) further comprises:
   producing the clutch slip after the lash crossing by setting the clutch capacity during the lash crossing to a magnitude lower than the driveline torque reaction after lash crossing, with clutch torque scaled relative to driveline torque based on a current transmission gear ratio.

20. The method of claim 9, wherein step (c) further comprises:
   after the lash crossing occurs, increasing clutch capacity at a rate lower than an increase in driveline torque corresponding to the estimated driveline twist rate.

21. The method of claim 9, wherein step (d) further comprising:
   preventing the clutch from relocking using at least one of engine torque increases and clutch torque decreases, based on a measured clutch slip and a rate of change of clutch slip.

22. The method of claim 9, further comprising:
   increasing engine torque such that a driver demanded engine torque is produced.

23. The method of claim 9, wherein step (d) further comprises:
   decreasing engine torque relative to clutch capacity if clutch slip is greater than a reference clutch slip; and
   increasing engine torque relative to clutch capacity if clutch slip is less than a reference clutch slip.

24. A method for controlling a driveline having a transmission clutch, comprising:
   (a) using engine torque to limit driveline twist rate while the clutch is locked and before a lash crossing;
   (b) maintaining the clutch locked during the lash crossing;
   (c) after the lash crossing, increasing a clutch capacity at a slower rate than the driveline twist rate;
   (d) producing clutch slip by controlling engine torque and the clutch capacity such that engine torque exceeds the clutch capacity.

25. The method of claim 24, wherein step (a) further comprises:
   producing clutch slip after the lash crossing by setting a clutch capacity less than a reaction torque to the lash crossing.

26. The method of claim 24, wherein step (c) further comprises:
   after the lash crossing occurs, increasing the clutch capacity at a slower rate than the driveline twist torque rate.

27. The method of claim 24, wherein steps (c) and (d) further comprises:
   preventing the clutch from relocking while engine torque and clutch capacity are controlled such that clutch slip is produced.

28. The method of claim 24, further comprising:
   increasing engine torque such that a driver demanded wheel torque is produced.

29. The method of claim 24, wherein step (d) further comprises:
   decreasing engine torque relative to clutch capacity if clutch slip is greater than a reference clutch slip; and
   increasing engine torque relative to clutch capacity if clutch slip is less than a reference clutch slip.

30. The method of claim 24, wherein step (a) further comprises using an estimated driveline twist and the driveline twist rate to determine a predicted drive line twist for the lash crossing.

31. The method of claim 24, wherein step (a) further comprises:
   estimating driveline twist;
   using speed of a transmission output and speed of a wheel speed to determine the driveline twist rate;
   using the estimated driveline twist, the driveline twist rate, and a torsional spring constant of a driveline shaft to determine a predicted drive line twist for the lash crossing.

32. A method for controlling a vehicle driveline having a power source and a transmission clutch, comprising:
   (a) producing, in response to a demanded wheel torque, a first signal that controls torque transmitted from the power source to the clutch during a lash crossing; and
   (b) producing a second signal that controls clutch torque capacity such that clutch slip is produced during the lash crossing.

33. The method of claim 32 further comprising:
   producing signals representing rotational speed at longitudinally spaced position on a halfshaft to determine a driveline reaction torque rate; and
   increasing clutch torque capacity at a lower rate than the driveline reaction torque rate.

34. The method of claim 32 further comprising:
   producing signals representing differential rotational speed across the clutch to determine a magnitude of the clutch slip.

* * * * *